United States Patent [19]

Ouchi

[11] Patent Number: 5,546,228

[45] Date of Patent: Aug. 13, 1996

[54] RE-IMAGING OPTICAL SYSTEM

[75] Inventor: Yumiko Ouchi, Chiba-Ken, Japan

[73] Assignee: Nikon Corporation, Tokyo, Japan

[21] Appl. No.: 390,787

[22] Filed: Feb. 17, 1995

[30] Foreign Application Priority Data

Feb. 18, 1994 [JP] Japan ................................. 6-021321

[51] Int. Cl.⁶ .......................... G02B 25/00; G02B 21/02; G02B 3/08
[52] U.S. Cl. ...................... 359/644; 359/645; 359/646; 359/659; 359/744
[58] Field of Search ................... 359/763, 744, 359/644, 645, 646, 766, 659

[56] References Cited

U.S. PATENT DOCUMENTS

| | | | |
|---|---|---|---|
| 3,671,099 | 7/1972 | Shoemaker et al. | 359/646 |
| 4,027,951 | 6/1977 | Mori et al. | 359/659 |
| 4,479,695 | 10/1984 | Neil | 359/744 |
| 4,501,474 | 2/1985 | Kimura | 359/659 |

FOREIGN PATENT DOCUMENTS

| | | |
|---|---|---|
| 59-86021 | 5/1984 | Japan . |
| 61-210312 | 9/1986 | Japan . |

*Primary Examiner*—Georgia Y. Epps
*Assistant Examiner*—Evelyn A. Lester
*Attorney, Agent, or Firm*—Oliff & Berridge

[57] ABSTRACT

A re-imaging objective optical system provides superior optical performance while having a short overall length and a relatively simple composition. The system has, in order from the object side of the optical system, a front lens group (G1) composed of a first lens group having a positive lens component (L1), a second lens group having a biconcave negative lens component (L2) and a third lens group having a positive lens component (L3); and a back lens group G2 composed of a cemented double lens element with components (L4 and L5) and a positive lens component (L6). The spatial or primary image $I_1$ from the objective optical system is formed on the optical path between the first lens group and the second lens group.

22 Claims, 10 Drawing Sheets

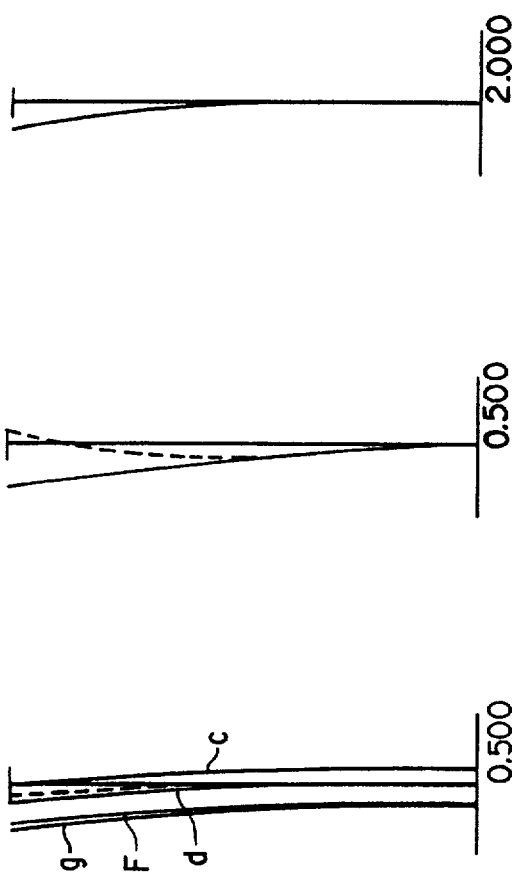
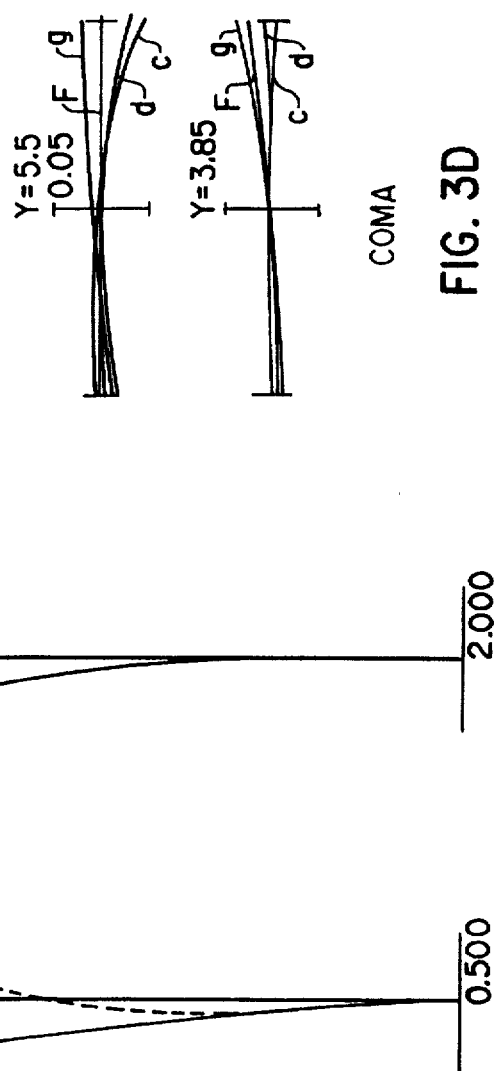
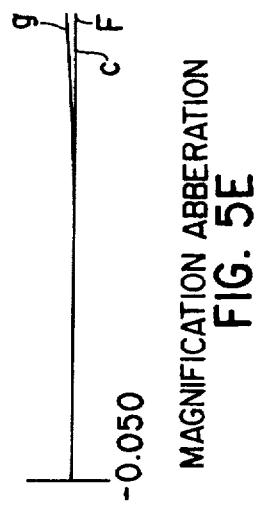

FIG. 5A SPHERICAL ABBERATION

FIG. 5B ASTIGMATISM

FIG. 5C DISTORTION ABBERATION

FIG. 5D COMA

FIG. 5E MAGNIFICATION ABBERATION

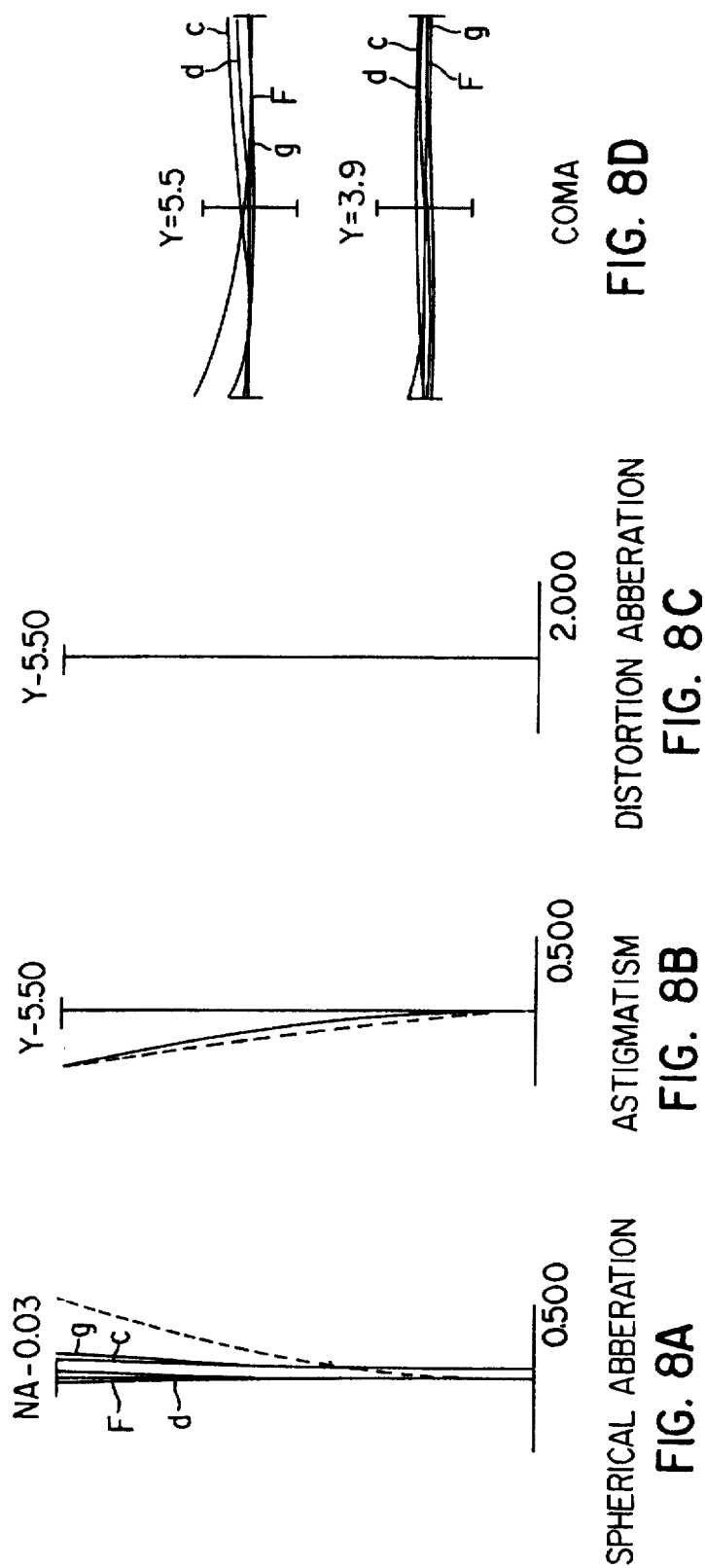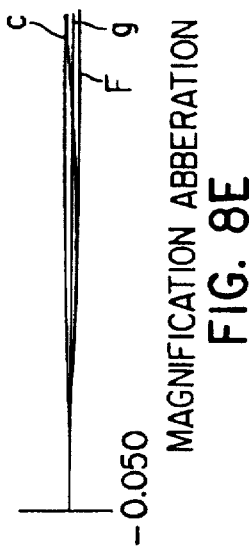

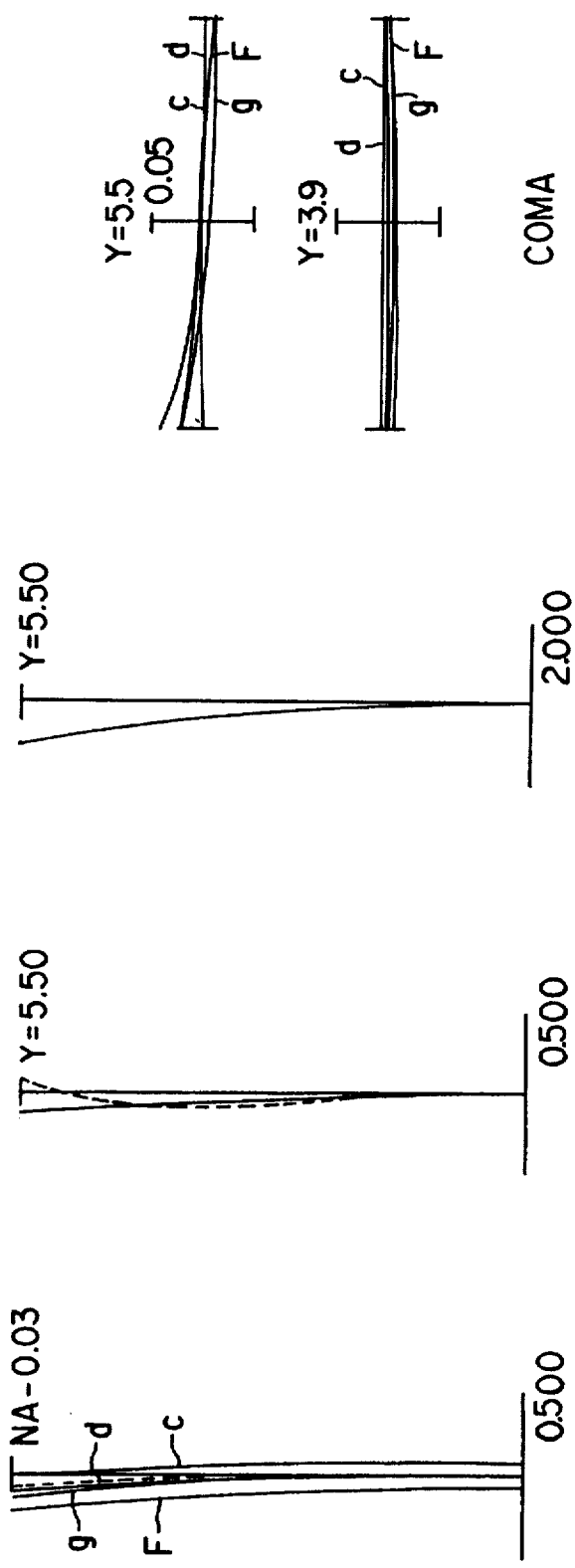
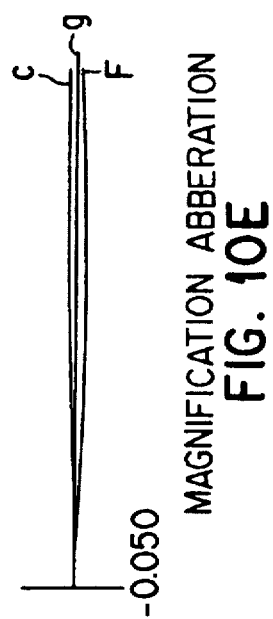
FIG. 10A SPHERICAL ABERRATION
FIG. 10B ASTIGMATISM
FIG. 10C DISTORTION ABBERATION
FIG. 10D COMA
FIG. 10E MAGNIFICATION ABBERATION

RE-IMAGING OPTICAL SYSTEM

BACKGROUND OF THE INVENTION

1. Field of the Invention

The present invention relates to a re-imaging optical system which causes the spatial image from an objective optical system to be re-composed under a specified magnification. The system is suitable for a device which composes a spatial image with a microscope objective lens.

2. Description of Related Art

In recent years, a system has been known where the composing of images formed by microscope objective lenses is achieved using imaging devices such as CCDs and the like. The imaging device is positioned at the primary imaging plane of the microscope objective lens. This type of system offers the advantage that the system itself can be easily manufactured and designed. However, because it is preferable to have a small imaging device, the system encounters a problem that the visual field ratio becomes smaller even though the visual field number for the microscope tends to expand.

Therefore, in recent years re-imaging optical systems have been used which re-compose the spatial image formed by the microscope objective lens under a specified magnification on an imaging device. However, with the above re-imaging optical system, the problem exists that the object image on the imaging device is inferior compared to systems where the imaging device is positioned on the primary image plane of the microscope objective lens. This inferiority is due to aberrations in the re-imaging optical system. Increasing the number of lens component pieces in order to improve the optical performance of the re-imaging optical has been attempted. However, when performance is enhanced, the re-imaging optical system becomes longer. Thus, re-imaging optical systems have problems associated with increasing of the overall size of the system.

SUMMARY OF THE INVENTION

It is an object of the present invention to provide a re-imaging optical system that has superior optical performance and a short overall length. It is another object of this invention to provide a re-imaging optical system that has a relatively simple construction.

In order to achieve the above and other objects, the re-imaging optical system of the present invention is provided with a construction that forms a secondary image of a primary or spatial image under a specific magnification. The secondary image is positioned on the side of the objective optical system facing the spatial image formed by the objective optical system. The re-imaging optical system comprising: a front lens group comprising, in order from the objective optical system, a first lens group having a positive lens component, a second lens group having a biconcave negative lens component with a concave surface facing the secondary image, and a third lens group having a positive lens component; and a back lens group having a cemented double lens element which, includes a negative lens component facing the front lens group and a positive lens component, and the back lens group further includes a positive lens component. Furthermore, the spatial image is formed on the optical path between the first lens group and the second lens group.

With the present invention having the above-described design, it is possible for the principal point distance to be negative. This is due to the arrangement of the refracting powers in a positive-negative-positive order in the front lens group. The principle point distance is the distance between the primary or front side principal point and the secondary or back side principal point of the front lens group. It is possible for the primary or front side principal point to be positioned on the image side of the secondary or back side principal point. By this arrangement, it is possible to reduce the overall length of the re-imaging optical system.

In addition, the present invention offers the advantage that the diameter of the re-imaging optical system does not increase because the first lens group serves as the field lens.

Furthermore to achieve its objects, the present invention offers the advantage that it is possible for the secondary or back side principal point of the back lens group to be positioned on the secondary image side. Back focus can be obtained to a specified degree, because the double lens element in the back lens group is positioned so that the negative lens component is positioned toward the front lens group.

In addition to the above arrangement, it is preferable for the re-imaging optical system of the present invention to satisfy the following condition:

$$3.0 \leq (f11/f1) \leq 0.85 \tag{1}$$

Here, f1 is the composite focal length of the front lens group, and f11 is the focal length of the first lens group.

Condition (1) is a condition which specifies the optimum range for the focal length of the first lens group relative to the composite focal length of the front lens group. Meeting the range of condition (1) keeps the overall length of the lens system short. When the lower limit in condition (1) is breached, the exit pupil position in the re-imaging optical system moves toward the front side (the side from which light is incident). It is possible for the distance between the front lens group and the back lens group to be shortened, however, this is not desirable since distortions and comas tend to occur. In addition, when the upper limit in condition (1) is exceeded, the distance between the front lens group and the back lens group increases. This increase is not desirable because shortening of the overall length of the system then becomes impossible.

It is desirable for the lower limit in condition (1) to be 0.4 and for the upper limit in condition (1) to be 0.7, in order to suppress the creation of aberrations and to shorten the overall length. It is more advantageous for the lower limit to be 0.5 to further suppress aberrations. It is also desirable for the upper limit to be 0.65 to further shorten the overall length.

In addition, it is desirable to have a arrangement which shortens the composite focal length of the front lens group to shorten overall length. However, when this occurs, Petzval's sum tends to increase. Therefore, calling f1 the composite focal length of the front lens group and ra the radius of curvature of the lens surface on the side of the negative lens component toward the secondary image in the second lens group, it is desirable for the re-imaging optical system of the present invention to satisfy the following condition:

$$0.07 \leq (|ra|/f1) \leq 0.55 \tag{2}$$

Condition (2) is a condition relating to the correction of Petzval's sum. Here, breaching the lower limit of condition (2) is not desirable because Petzval's sum cannot be corrected and field of curvature occurs. In addition, exceeding the upper limit of condition (2) is not desirable because although Petzval's sum can be corrected, other aberrations, especially comas, result.

It is desirable for the lower limit in condition (2) to be 0.1 and for the upper limit to be 0.4 in order to correct the various aberrations and obtain a good imaging performance. To achieve an even better imaging performance, it is desirable for the lower limit in condition (2) to be 0.13 and for the upper limit to be 0.25.

With the re-imaging optical system of the present invention, it is desirable to have a short distance between the second lens group and the third lens group of the front lens group. The front lens group, as noted above has a positive-negative-positive arrangement of refracting powers. It is thus possible to make the principal point distance of the front lens group even more negative, and thereby reduce the overall length.

Therefore, it is desirable for the above-described group distance to satisfy the following condition:

$$0 \leq (D/f1) \leq 0.25 \quad (3)$$

Here, f1 is the composite focal length of the front lens group. D is the group distance between the second lens group and the third lens group.

When the lower limit of condition (3) is breached, the second lens group and the third lens group interfere with each other. This interference is not desirable. When the upper limit of condition (3) is exceeded, the secondary or back side principal point of the front lens group moves toward the secondary image side. The overall length of the re-imaging optical system becomes longer. Both occurrences are undesirable.

Considering the simplicity of the mechanism of the lens barrel which supports the second and third lens group, it is desirable for the lower limit in condition (3) to be 0.05. It is particularly desirable for the lower limit in condition (3) to be 0.1, in order to correct distortions. In addition, it is desirable for the upper limit in condition (3) to be 0.18 in order to shorten overall length. It is particularly desirable to have an upper limit of 0.15 in order to further shorten overall length.

Condition (4) specifies the optimum range of the radius of curvature of the composition surface of the cemented lens component in the back lens group to correct for comas and chromatic aberrations.

Calling f2 the composite focal length of the back lens group and rb the radius of curvature of the composition surface of the cemented double element lens in the back lens group, it is desirable for the re-imaging optical system of the present invention to satisfy the following condition (4).

$$0.17 \leq (|rb|/f2) \leq 0.95 \quad (4)$$

When the lower limit in condition (4) is breached, chromatic aberrations are excessively corrected which is undesirable. Comas, and in particular upper comas, tend to worsen when the upper limit in condition (4) is exceeded. This result is also undesirable. In order to have good correction of chromatic aberration, it is desirable for the lower limit in condition (4) to be 0.3. In order to have good coma correction, it is desirable for the upper limit in condition (4) to be 0.8. Furthermore, to achieve even better chromatic aberration correction, it is desirable for the lower limit in condition (4) to be 0.4. To further improve correction of comas, it is desirable for the upper limit in condition (4) to be 0.65.

It is also desirable for the present invention to be configured so as to satisfy the following condition:

$$0.65 \leq (f22/f2) \leq 1.8 \quad (5)$$

f22 is the focal length of the positive lens component in the back lens group and f2 is the composite focal length of the back lens group.

When the lower limit in condition (5) is breached, the refracting power of the positive lens component becomes stronger, relative to the refracting power of the back lens group. As a result undesirable distortions are created. In addition, when the upper limit in condition (5) is exceeded, the secondary or back side principal point of the back lens group is positioned closer to the front side and the back focus becomes too short. This is undesirable.

In order to achieve good correction of the various aberrations, it is desirable for the lower limit in condition (5) to be 0.78. In particular, to achieve good correction of distortion, it is desirable for the lower limit in condition (5) to be 0.9. In addition, in order to maintain a prescribed back focus, it is desirable for the upper limit in condition (5) to be 1.6.

BRIEF DESCRIPTION OF THE DRAWINGS

Preferred embodiments are described with reference to the drawings, in which like reference characters denote like elements throughout the figures, and in which:

FIGS. 3A, 3B, 3C, 3D and 3E illustrate spherical aberrations, astigmatism, distortion aberrations, coma, and magnification chromatic aberrations, respectively, according to an embodiment of the present invention;

FIGS. 8A, 8B, 8C, 8D and 8E illustrate spherical aberrations, astigmatism, distortion aberrations, coma, and magnification chromatic aberrations, respectively, according to a third embodiment of the present invention;

FIGS. 10A, 10B, 10C, 10D and 10E illustrate spherical aberrations, astigmatism, distortion aberrations, coma, and magnification chromatic aberration, respectively, according to a fourth embodiment of the present invention.

DESCRIPTION OF THE PREFERRED EMBODIMENT

The preferred embodiment of the present invention is described hereafter, with reference to the drawings.

Figure 1:
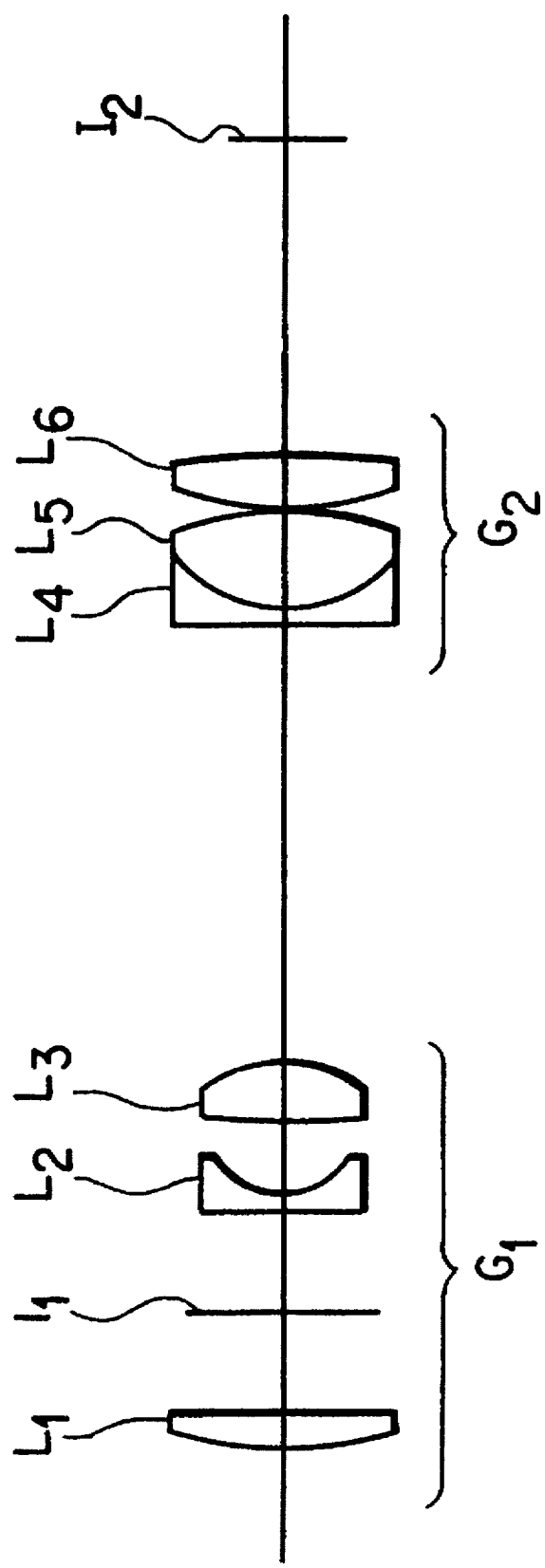
FIG. 1 is a schematic drawing of the lens configuration according to a first embodiment of the present invention.

FIG. 1 is a drawing of the lens configuration of a first embodiment of the present invention. The re-imaging objective optical lens system of the first embodiment is composed of front lens group G1 and back lens group G2, in the order from the object side of the optical system. Light from the subject that passes through the objective optical system and forms a primary or spatial image $I_1$ in front lens group G1.

Light from this primary image $I_1$ then passes through front lens group G1 and back lens group G2. The light then forms a secondary image $I_2$ which is a specified magnification of the primary image $I_1$.

The front lens group G1 has, in order from the object side of the optical system: a positive plano-convex lens component L1, having a convex surface facing the object side of the optical system; a negative biconcave lens component L2, with a strong concave surface facing the secondary image $I_2$; and a positive biconvex lens component L3, with a strong convex surface facing the secondary image $I_2$.

The second lens group G2 has, in order from the object side of the optical system side, a cemented double lens element comprising a negative meniscus lens component L4, having a convex surface facing the object side of the optical system and a positive biconvex lens component L5, having a strong convex surface facing the object side of the optical system; and a positive biconvex lens component L6, having a strong convex surface facing the object side of the optical system. Negative lens component L4 is fixed to the positive lens component L5.

Figure 2:
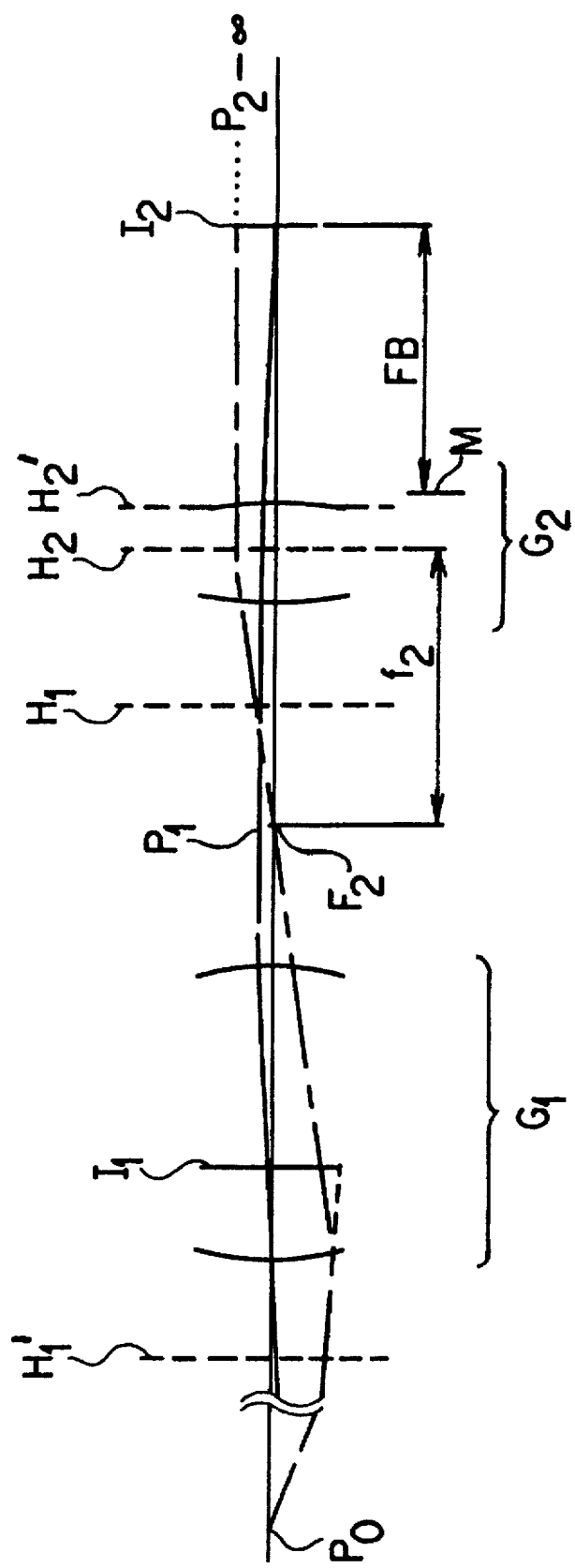
FIG. 2 is a representation of the principle behind the present invention.

The exit pupil position $P_1$ of the front lens group G1 and the front side focal point position $F_2$ of the back lens group G2 coincide, as shown in FIG. 2. Accordingly, primary light rays which pass through the exit pupil position $P_0$ of the objective optical system (shown in this drawing as a broken line), intersect the optical axis at the exit pupil position $P_1$ of the front lens group G1. After passing through the back lens group G2, the light rays are emitted parallel to the optical axis. At this time, the exit pupil position $P_2$ of the back lens group G2 is infinitely distant. Therefore, the secondary image $I_2$ side is telecentric.

The front lens group G1 has refractory powers arranged in a positive-negative-positive order, as shown in FIG. 1. Thus, the front side principal point $H_1$ of the front lens group G1 is positioned on the object side of the secondary image $I_2$, while the back side principal point $H_1'$ is positioned on the side toward the object optical system. It is possible, therefore, to shorten the overall length of the front lens group G1.

The cemented double lens components L4 and L5 of the back lens group G2 have refractory powers arranged in a negative-positive order. Positive lens component L6, which follows the cemented lens element, has a relatively strong refractory power. The back side principal point $H_2'$ of the back lens group G2 is positioned on the side toward the secondary image because of this design. Thus, it becomes possible for the back focus to become longer to secure a flange back FB, which is the distance between the mounting surface M and the secondary image $I_2$.

The values of the various dimensions of the primary embodiment are shown hereafter, in Table 1. In Table 1, f is the focal length of the entire system, β is the magnification, and NA is the numerical aperture. In addition, the number in the leftmost column indicates the lens in order from the object side toward the subject, r is the radius of curvature of each lens surface, d is the distance between lens surfaces, $n_d$ is the index of refraction relative to d line (v=587.6 nm), and $v_d$ is the Abbe number for d lines. In Table 1, $d_o$ is the distance from the primary image $I_1$ to the positive lens component $L_1$, and Y is the height of the secondary image $I_2$.

TABLE 1

| f = –105, β = –0.6, NA = 0.04, do = –14, Y = 5.5 | | | | | |
|---|---|---|---|---|---|
| NO. | r | d | $n_d$ | $v_d$ | |
| 1 | 25.2 | 4.0 | 1.78797 | 47.5 | $L_1$ |
| 2 | 0.0 | 20.0 | | | |
| 3 | –281.0 | 2.0 | 1.75520 | 27.6 | $L_2$ |
| 4 | 8.7 | 7.0 | | | |
| 5 | 75.3 | 5.0 | 1.74810 | 52.3 | $L_3$ |
| 6 | –13.4 | 43.5 | | | |
| 7 | 442.3 | 2.0 | 1.78470 | 26.1 | $L_4$ |
| 8 | 14.7 | 9.0 | 1.51454 | 61.1 | $L_5$ |
| 9 | –59.1 | 0.5 | | | |
| 10 | 26.7 | 5.5 | 1.69680 | 55.6 | $L_6$ |
| 11 | –61.7 | 30.8 | | | |

FIGS. 3A–3E show various aberrations in the re-imaging optical system according to first embodiment. Here, in the field curve drawing of spherical aberrations, FIG. 3A, the dashed line indicates a sine condition. In the field curve drawing of astigmatism, FIG. 3B, the dotted line indicates the meridional image surface, while the solid line indicates the sagittal image surface. Furthermore, the representation of coma in FIG. 3D illustrates situations where the image heights are 100% and 70%. The drawings of the various aberrations illustrate situations where light rays have been traced from a hypothetical exit pupil for the object optical system.

As shown in FIGS. 3A–3E, the re-imaging optical system of the present embodiment has superior re-imaging performance while the lens configuration has an overall short length.

Figure 4:
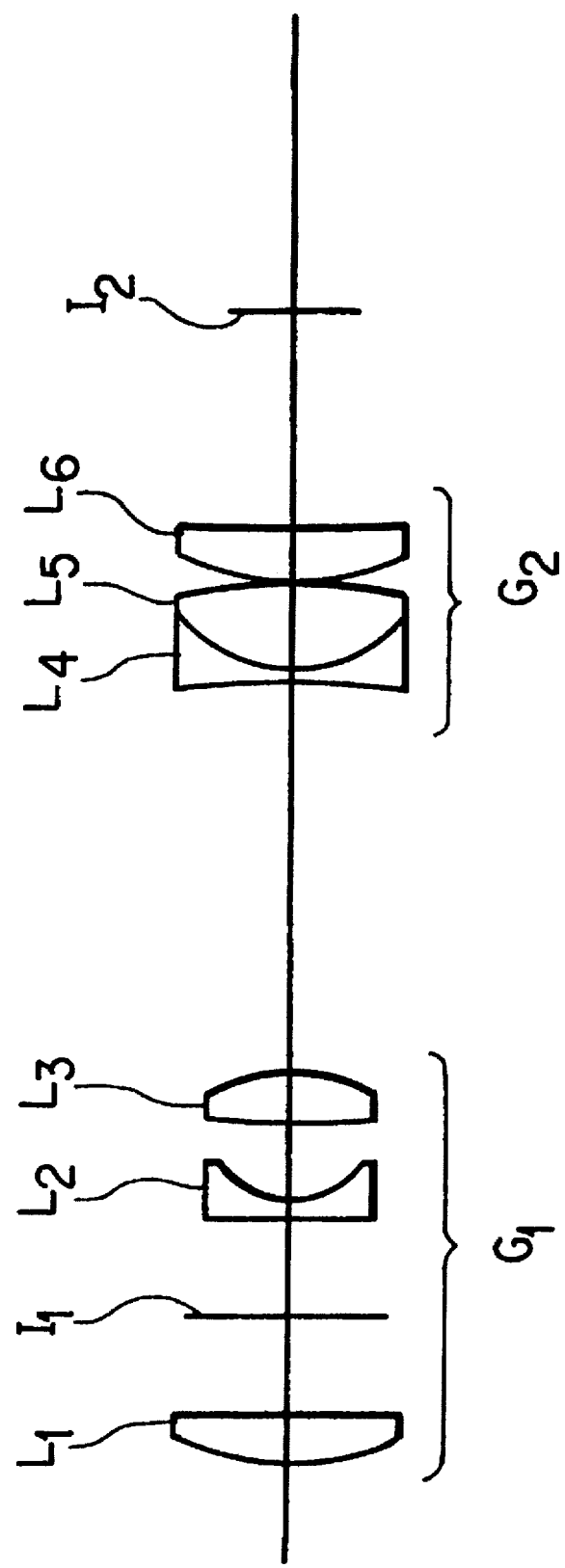
FIG. 4 is a schematic drawing of the lens configuration according to a second embodiment of the present invention.

A second embodiment of the present invention is shown in FIG. 4. In FIG. 4, the re-imaging optical system of the second embodiment has, in order from the objective optical system side, a front lens group G1 and a back lens group G2. The front lens group G1 has the same composition as in the first embodiment.

The back lens group G2 has, in order from the object side of the optical system, a cemented double lens element comprising a negative biconcave lens component L4, having a strong concave surface facing the secondary image $I_2$, and a positive biconvex lens component L5, having a strong convex surface facing the object side of the optical system, and a positive meniscus lens component L6 having convex surface facing the object side of the optical system. With the arrangement of this embodiment, the primary or front side principal point position of the back lens group $G_2$ coincides with the exit pupil position of the front lens group $G_1$, so that telecentricity is achieved on the secondary image $I_2$ side.

Hereafter, the values of the various dimensions of the second embodiment are shown in Table 2. In Table 2, f is the focal length of the entire system, β is the magnification, and NA is the numerical aperture N.A. In addition, the number in the leftmost column indicates the lens in order from the object side toward the subject, r is the radius of curvature of each lens surface, d is the distance between lens surfaces, $n_d$ is the index of refraction relative to d lines (λ=587.6 nm), and $v_d$ is the Abbe number of d lines. In Table 2, $d_o$ is the distance from the primary image $I_1$ to the positive lens component L1, and Y is the height of the secondary image $I_2$.

TABLE 2

| No. | r | d | $n_d$ | $v_d$ | |
|-----|------|------|---------|------|-------|
| \multicolumn{6}{|l|}{f = −86, β = −0.45, NA = 0.04, $d_o$ = −14, Y = 4.3} |
| 1 | 25.2 | 4.0 | 1.78797 | 47.5 | $L_1$ |
| 2 | 0.0 | 20.0 | | | |
| 3 | −281.0 | 2.0 | 1.75520 | 27.6 | $L_2$ |
| 4 | 8.7 | 7.0 | | | |
| 5 | 75.3 | 5.0 | 1.74810 | 52.3 | $L_3$ |
| 6 | −13.4 | 38.0 | | | |
| 7 | −182.8 | 2.0 | 1.78470 | 26.1 | $L_4$ |
| 8 | 14.1 | 8.0 | 1.62280 | 57.0 | $L_5$ |
| 9 | −29.2 | 0.5 | | | |
| 10 | 18.6 | 5.0 | 1.71300 | 53.9 | $L_6$ |
| 11 | 160.8 | 21.1 | | | |

Figure 5:
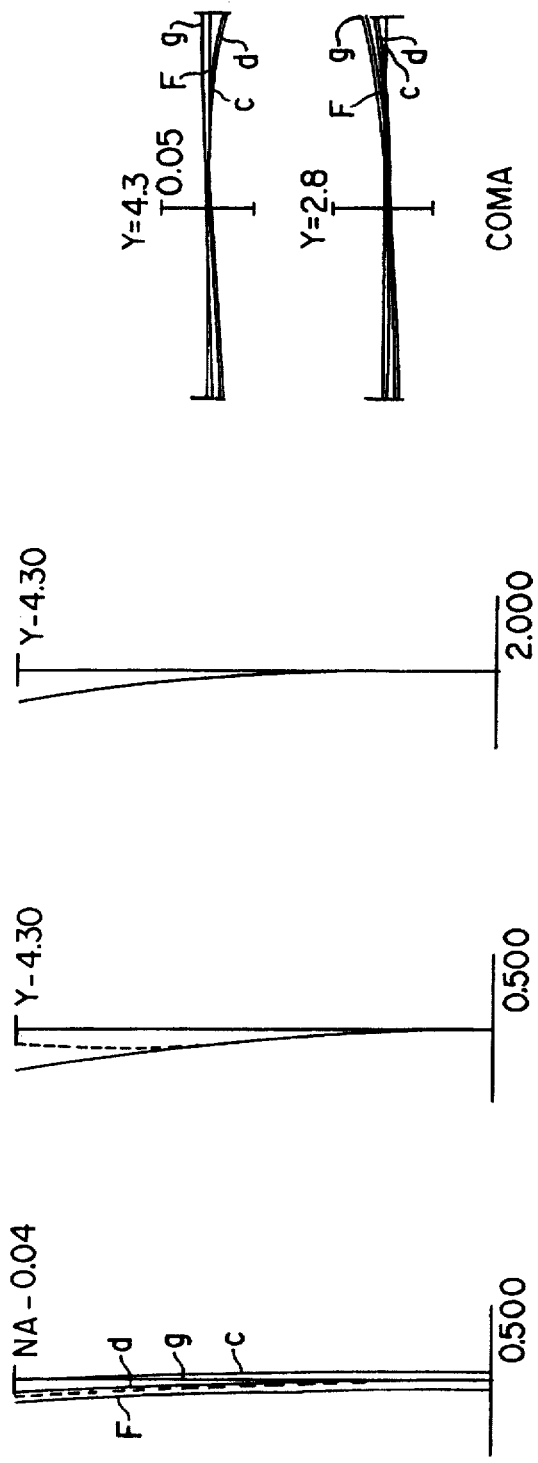
FIGS. 5A, 5B, 5C, 5D and 5E illustrate spherical aberrations, astigmatism, distortion aberrations, coma, and magnification chromatic aberrations, respectively, according to a second embodiment of the present invention.

FIGS. 5A–5E illustrate various aberrations in the re-imaging optical system according to the second embodiment. In the field curve drawing of spherical aberrations, FIG. 5A, the dashed line indicates a sine condition. In the field curve drawing of astigmatism, FIG. 5B, the dotted line indicates the meridional image surface, while the solid line indicates the sagittal image surface. Furthermore, the representation of coma in FIG. 5D illustrates situations where the image heights are 100% and 70%. The drawings of the various aberrations illustrate situations where light rays have been traced from a hypothetical exit pupil for the optical system.

As shown in FIGS. 5A–5E, the re-imaging optical system of the present embodiment has superior re-imaging performance while having a lens configuration with short overall length.

With the first and second embodiments, telecentricity is achieved on the secondary image side. In the case of a single tip imaging device, complete image-side telecentricity is not required and it is not necessary for the side facing the secondary image $I_2$ to be telecentric.

In addition, it is possible to change the re-imaging magnification by altering the configuration of the back lens group $G_2$, as can be seen from the first and second embodiments. This is advantageous because only back lens group $G_2$ needs be altered, even when the re-imaging magnification is changed for changing the size of the imaging device. It is also acceptable to change the re-imaging magnification by making the back lens group G2 in the first embodiment and the back lens group G2 in the second embodiment interchangeable.

Figure 6:
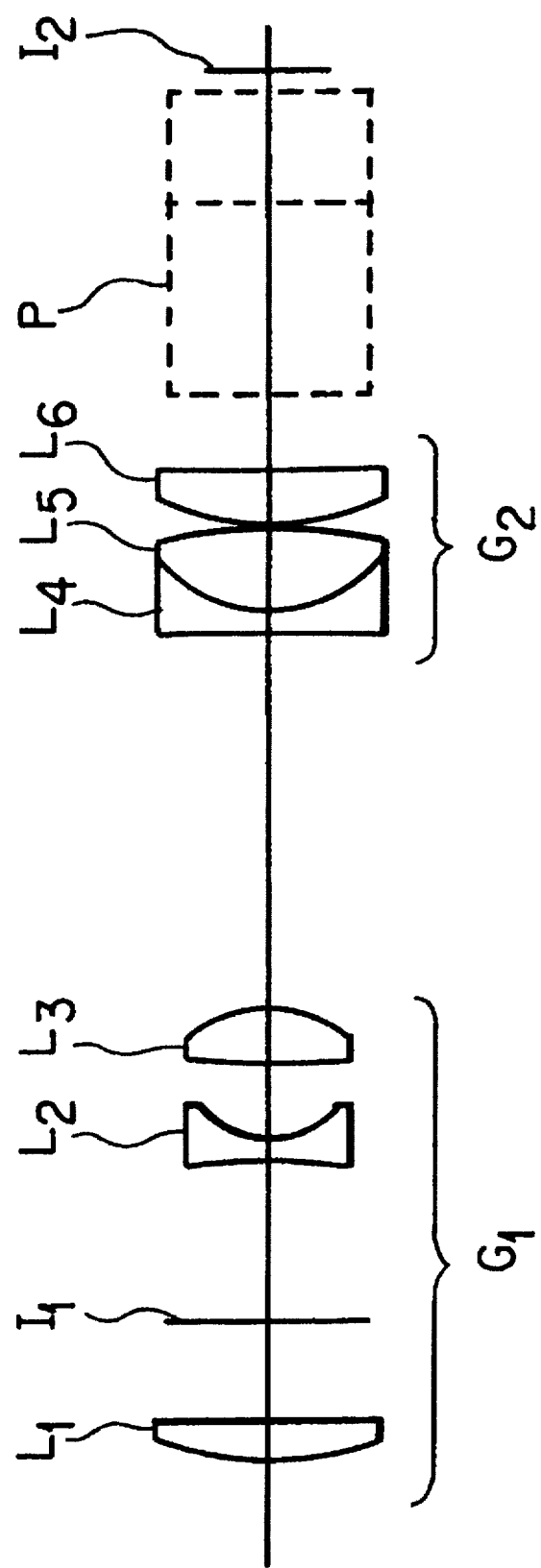
FIG. 6 is a schematic drawing of the lens configuration according to a third embodiment of the present invention.
Figure 7:
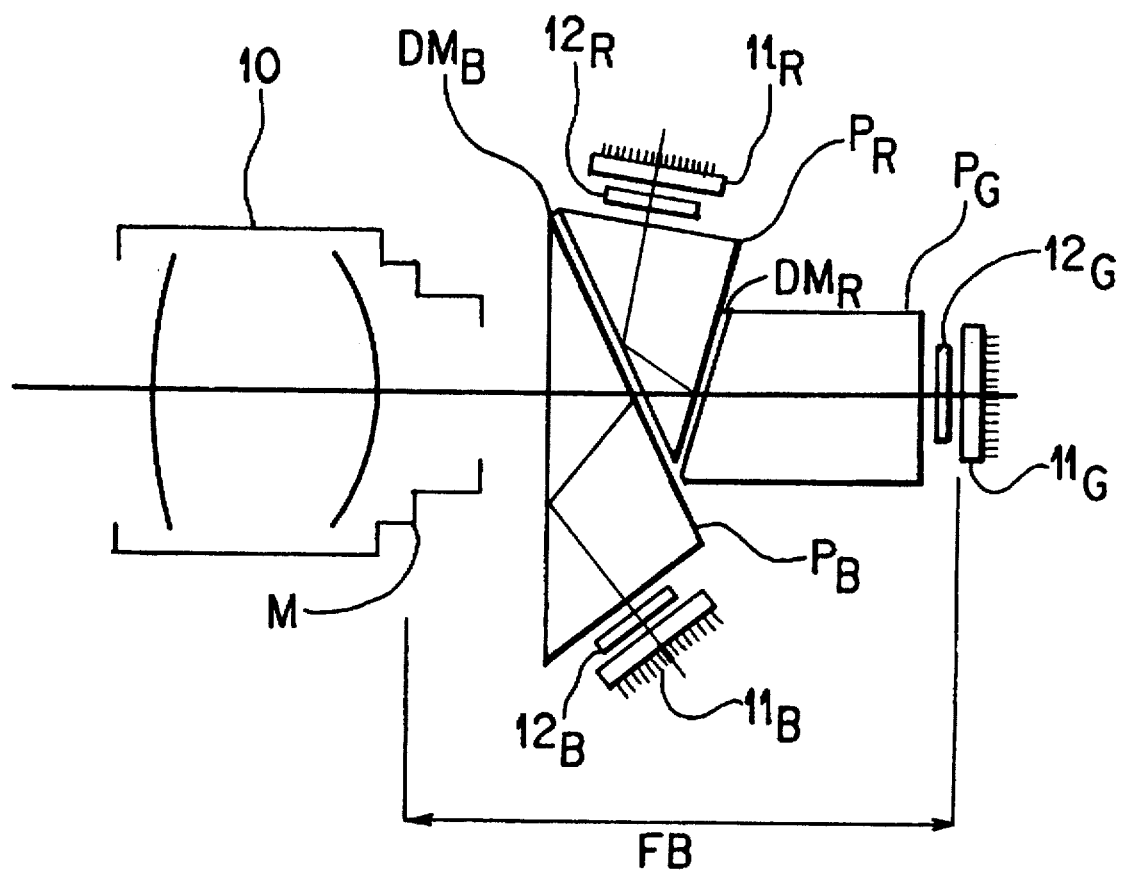
FIG. 7 is a drawing showing the structure of a color separation prism according to the present invention.

A third embodiment of the present invention is described in FIG. 6. The re-imaging optical system according to the third embodiment is an example wherein a color separation prism P is provided on the side of the secondary image $I_2$. This corresponds to color photography with a three tip camera. The color separation prism P is shown in FIG. 7. The color separation prism P is positioned in the optical path between the re-imaging optical system 10 and imaging devices 11B, 11G and 11R, which are comprised of CCDs or the like. The prism is composed of three prism blocks $P_B$, $P_G$ and $P_R$. A dichroic membrane $DM_B$ reflects blue light and is positioned at the composition surface of prism block $P_B$ and prism block $P_R$.

Dichroic membrane $DM_R$ reflects red light and allows green light to pass. Dichroic membrane $DM_R$ provided at the composition surface of prism block $P_G$ and prism block $P_R$. In addition, trimming filters 12B, 12G and 12R which prevent moire patterns on the imaging devices are provided in the optical path between each prism block $P_B$, $P_G$ and $P_R$ and the imaging devices 11B, 11G and 11R.

In FIG. 6, the re-imaging optical system of the third embodiment is comprised of, in order from the object side of the optical system, a front lens group G1, a back lens group G2 and a color separation prism P. The color separation prism P is shown in its opened state.

In FIG. 6, the front lens group G1 has, in order from the objective optical system side, a positive plano-convex lens component L1 having the convex surface facing the object side of the optical system, a negative biconcave negative lens component L2 having a strong concave surface facing the secondary image $I_2$, and a positive biconvex lens component L3 having a strong convex surface facing the secondary image $I_2$. The back lens group G2 has, in order from the object side of the optical system side, a cemented double lens element comprises of a negative biconcave lens component L4 having a strong concave surface facing the secondary image $I_2$ and a positive biconvex lens component L5 having a strong convex surface facing the object side of the optical system, and a positive meniscus lens component L6 having a convex surface on the side toward the object side of the optical system.

In the third embodiment, the exit pupil position of the front lens group G1 and the primary or front side focus position of the back lens group G2 coincide. Thus, telecentricity is achieved on the side toward the secondary image $I_2$.

The third embodiment is arranged so that light rays gradually disperse as they move from the front lens group G1 toward the back lens group G2. It is possible to shorten the overall length of the system by shortening the group distance between the front lens group G1 and the back lens group G2.

Hereafter, the values of the various dimensions of the third embodiment are shown in Table 3. In Table 3, f is the focal length of the entire system, β is the magnification, and NA is the numerical aperture. In addition, the number in the leftmost column indicates the lens in order from the object side toward the subject, r is the radius of curvature of the lens surface, d is the distance between lens surfaces, $n_d$ is the index of refraction relative to d line (λ=587.6 nm), and $v_d$ is the Abbe number of d line. In table 3, $d_o$ is the distance from the primary image $I_1$ to the positive lens component L1, and Y is the height of the secondary image $I_2$. In Table 3, the back focus is indicated by a value for the length of the color separation prism P converted to atmospheric conditions. The color separation prism P has the dimensions shown in below-described table 5.

TABLE 3

| NO. | r | d | $n_d$ | $v_d$ | |
|-----|------|------|---------|------|-------|
| \multicolumn{6}{|l|}{f = −922, β = 0.6, NA = 0.03 d0 = −4, Y = −5.5} |
| 1 | 29.5 | 4.0 | 1.78797 | 47.5 | $L_1$ |
| 2 | 0.0 | 26.0 | | | |
| 3 | −50.80 | 2.0 | 1.74950 | 35.2 | $L_2$ |
| 4 | 13.0 | 7.0 | | | |
| 5 | 93.3 | 5.0 | 1.74400 | 45.0 | $L_3$ |
| 6 | −17.3 | 38.3 | | | |
| 7 | −197.0 | 2.0 | 1.75520 | 27.6 | $L_4$ |
| 8 | 20.5 | 8.0 | 1.62280 | 57.0 | $L_5$ |
| 9 | −35.9 | 0.5 | | | |
| 10 | 35.3 | 5.0 | 1.71300 | 53.9 | $L_6$ |
| 11 | 313.5 | 44.3 | | | |

FIGS. 8A–8E illustrate various aberrations in the re-imaging optical system according to the third embodiment. In the field curve drawing of spherical aberrations, FIG. 8A, the dashed line indicates a sine condition. In the field curve drawing of astigmatism, FIG. 8B, the dotted line indicates the meridional image surface, while the solid line indicates the sagittal image surface. Furthermore, the representation of coma in FIG. 8D illustrates situations where the image heights are 100% and 70%. The drawings of the various aberrations illustrate situations where light rays have been traced from a hypothetical exit pupil for the optical system. The drawings also illustrate the situation where the color separation prism P is inserted in the optical path between the re-imaging optical system and the secondary image $I_2$.

As shown in FIGS. 8A–8E, the re-imaging optical system of the third embodiment has superior re-imaging performance while having a lens configuration with short overall length. The back focus is maintained where it is possible to provide a color separation prism.

Figure 9:
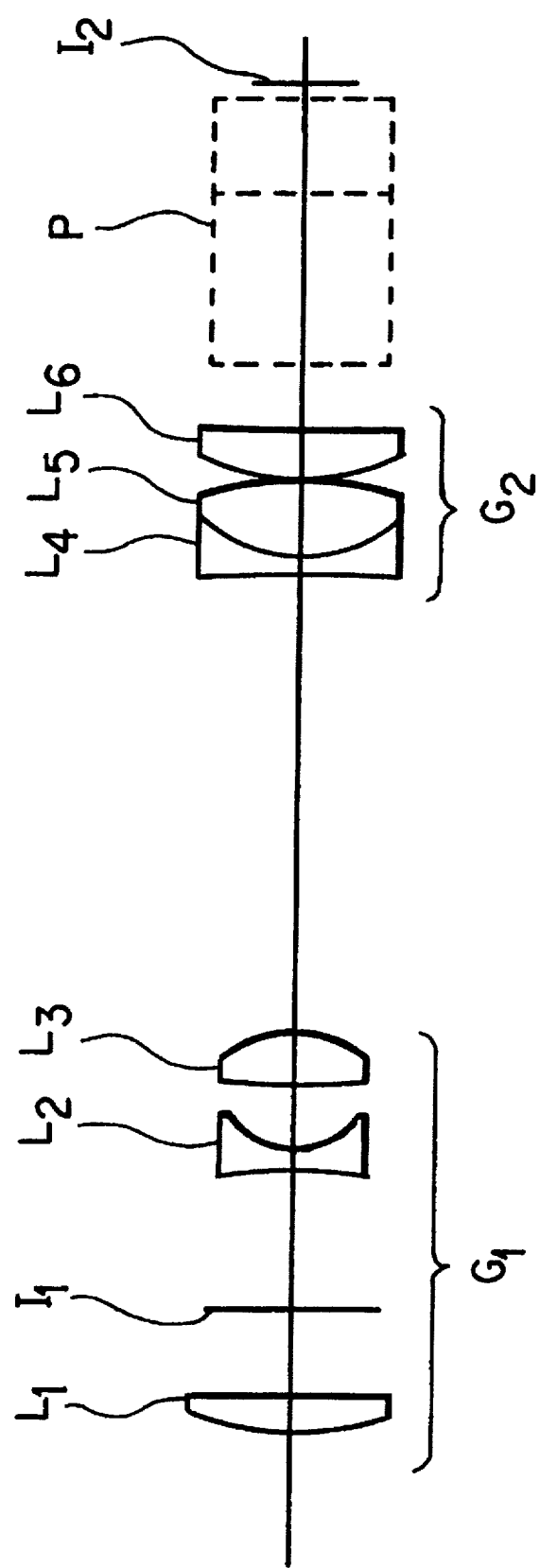
FIG. 9 is a schematic drawing of the lens configuration according to a fourth embodiment of the present invention.

A fourth embodiment of the invention is described with reference to FIG. 9. The lens configuration of the fourth embodiment is the same as in FIG. 6 of the third embodiment.

The values of the various dimensions of the fourth embodiment are shown in Table 4. In Table 4, f is the focal length of the entire system, β is the magnification, and NA is the numerical aperture. In addition, the number in the leftmost column indicates the lens in order from the object side toward the subject, r is the radius of curvature of the lens surface, d is the distance between lens surfaces, nd is the index of refraction relative to d lines (λ=587.6 nm), and $v_d$ is the Abbe number of d lines. In Table 4, $d_o$ is the distance from the primary image $I_1$ to the positive lens component L1. Y is the height of the secondary image $I_2$. In Table 4, the back focus is indicated by a value for the length of the color separation prism P converted to atmospheric conditions. The color separation prism P has the dimensions shown in below-described table 5.

TABLE 4 f = −235, β = −0.6, NA = 0.03, $d_o$ = −14, Y = 5.5

| NO. | r | d | $n_d$ | $v_d$ | |
|---|---|---|---|---|---|
| 1 | 28.7 | 4.0 | 1.78797 | 47.5 | $L_1$ |
| 2 | 0.0 | 26.0 | | | |
| 3 | −33.5 | 2.0 | 1.74000 | 28.2 | $L_2$ |
| 4 | 9.0 | 7.0 | | | |
| 5 | 67.0 | 5.0 | 1.74810 | 52.3 | $L_3$ |
| 6 | −14.1 | 51.8 | | | |
| 7 | −138.6 | 2.0 | 1.75692 | 31.6 | $L_4$ |
| 8 | 16.8 | 8.0 | 1.62041 | 60.1 | $L_5$ |
| 9 | −45.0 | 0.5 | | | |
| 10 | 26.1 | 5.0 | 1.71300 | 53.9 | $L_6$ |
| 11 | 129.71 | 39.4 | | | |

FIGS. 10A–10E illustrate various aberrations in the re-imaging optical system of the fourth embodiment. In the field curve drawing of spherical aberrations, FIG. 10A, the dashed line indicates a sinusoidal condition. In the field curve drawing of astigmatism, FIG. 10B, the dotted line indicates the meridional image surface, while the solid line indicates the sagittal image surface. Furthermore, the representation of coma in FIG. 10D illustrates situations where the image heights are 100% and 70%. The drawings of the various aberrations illustrate situations wherein light rays have been traced from a hypothetical exit pupil for the object optical system. The drawings also illustrate the situation where the color separation prism P is inserted on the optical path between the re-imaging optical system and the secondary image I2.

As shown in FIG. 10, the re-imaging optical system of the fourth embodiment has superior re-imaging performance while having a lens configuration with short overall length. The back focus is maintained where it is possible to provide a color separation prism.

Light rays are parallel between the front lens group G1 and the back lens group G2 in the re-imaging optical system according to the fourth embodiment. This offers the advantage that the entire system need not be optically redesigned, even when the re-imaging magnification is changed. Redesigning either the front lens group G1 or the back lens group G2 of the fourth embodiment will be sufficient to change the re-imaging magnification, for example by changing the size of the imaging devices.

The dimensions of the color separation prism P of the above-described third and fourth embodiments are shown below in Table 5.

TABLE 5

| NO. | r | d | $n_d$ | $v_d$ |
|---|---|---|---|---|
| 1 | 0.0 | 30.0 | 1.60342 | 38.0 |
| 2 | 0.0 | 16.2 | 1.51680 | 64.1 |
| 3 | 0.0 | | | |

The color separation prism P in Table 5 does not change optically regardless of where it is between the lens surface farthest to the secondary image side and the secondary image plane $I_2$ on the optical path.

The numerical values for conditions for each of the above-described embodiments are shown in Table 6.

TABLE 6

| | 1 | 2 | 3 | 4 |
|---|---|---|---|---|
| (1) | 0.64 | 0.64 | 0.62 | 0.55 |
| (2) | 0.17 | 0.17 | 0.22 | 0.14 |
| (3) | 0.14 | 0.14 | 0.12 | 0.11 |
| (4) | 0.49 | 0.63 | 0.55 | 0.42 |
| (5) | 0.91 | 1.30 | 1.50 | 1.13 |

Each of the embodiments of the present invention are configured so as to satisfy above-described conditions (1) to (5).

In each of the above-described embodiments, the positive lens component L1 is provided closer to the object side of the optical system than the spatial image I1 is from the object side of the optical system. This results in the overall length of the re-imaging optical system being shortened. Further, dust-prevention of the system can also be readily achieved by providing the system with a short length and simple structure. By this arrangement, with the present invention it is possible to provide a re-imaging optical system having a superior optical performance while having short overall length and a relatively simple structure.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A re-imaging optical lens system which forms a secondary image of a spatial image under a specific magnification, the secondary image positioned on an object side of the optical lens system facing the spatial image formed by the optical lens system, the re-imaging optical lens system comprising:

11 a front lens group and a back lens group;

the front lens group comprising, in order from the object side of the optical lens system, a first lens group having a positive lens component, a second lens group having a negative biconcave lens component with a highly concave surface facing the secondary image, and a third lens group having a positive lens component;

the back lens group comprising a cemented double lens element with a negative lens component facing the front lens group, and the back lens group also comprises a positive lens component, wherein the spatial image is formed on an optical path between the first lens group and the second lens group.

2. The re-imaging optical lens system according to claim 1, wherein the re-imaging optical lens system satisfies the following conditions:

$$0.3 \leq (f11/f1) \leq 0.85$$

$$0.07 \leq (|ra|/f1) \leq 0.55$$

$$0 \leq (D/f1) \leq 0.25$$

where f1 is the composite focal length of the front lens group; f11 is the focal length of the first lens group; ra is the radius of curvature of the lens surface of the negative lens component in the second lens group facing the secondary image; and D is the distance between the second lens group and the third lens group of the front lens group.

3. The re-imaging optical lens system according to claim 1, wherein the re-imaging optical lens system satisfies the following conditions:

$$0.17 \leq (|rb|/f2) \leq 0.95$$

$$0.65 \leq (f22/f2) \leq 1.8$$

where f2 is the composite focal length of the back lens group; f22 is the focal length of the positive lens component in the back lens group; and rb is the radius of curvature of a composition surface of the cemented double lens element in the back lens group.

4. The re-imaging optical lens system according to claim 2, wherein the re-imaging optical lens system also satisfies the following conditions:

$$0.17 \leq (|rb|/f2) \leq 0.95$$

$$0.65 \leq (f22/f2) \leq 1.8$$

where f2 is the composite focal length of the back lens group; f22 is the focal length of the positive lens component in the back lens group; and rb is the radius of curvature of a composition surface of the cemented double lens element in the back lens group.

5. The re-imaging optical lens system according to claim 1, wherein the cemented double lens element of the back lens group includes a positive lens component fixed to the negative lens component.

6. A re-imaging optical lens system according to claim 1, wherein the first lens group includes a positive plano-convex lens.

7. A re-imaging optical lens system according to claim 6, wherein the convex surface of the positive plano-convex lens faces the object side of the lens system.

12

8. A re-imaging optical lens system according to claim 1, wherein the third lens group includes a positive biconvex lens.

9. A re-imaging optical lens system according to claim 8, wherein the positive biconvex lens includes a strong convex surface facing the secondary image.

10. A re-imaging optical lens system according to claim 1, wherein the negative lens component of the cemented double lens element of the back lens group includes a negative meniscus lens with a convex surface facing the object side of the optical lens system.

11. A re-imaging optical lens system according to claim 1, wherein the negative lens component of the cemented double lens element of the back lens group comprises a biconcave lens with a strong concave surface facing the secondary image.

12. A re-imaging optical lens system according to claim 1, wherein the positive lens component of the back lens group includes a positive biconvex lens.

13. A re-imaging optical lens system according to claim 12, wherein the positive biconvex lens includes a strong convex surface facing the object side of the optical lens system.

14. A re-imaging optical lens system according to claim 1, wherein the positive lens component of the back lens group includes a positive meniscus lens with a convex surface facing the object side of the optical lens system.

15. A re-imaging optical lens system according to claim 5, wherein the positive lens component of the cemented double lens element of the back lens group includes a positive biconvex lens.

16. A re-imaging optical lens system according to claim 15, wherein the positive biconvex lens of the cemented double lens element of the back lens group includes a strong convex surface facing the object side of the optical lens system.

17. A re-imaging optical lens system according to claim 1, wherein the first lens group includes a positive plano-convex lens;

the third lens group includes a positive biconvex lens;

the positive biconvex lens of the third lens group includes a strong convex surface facing the secondary image;

the negative lens component of the cemented double lens element of the back lens group includes a negative meniscus lens with a convex surface facing the object side of the optical lens system;

the cemented double lens element of the back lens group includes a positive lens component in the form of a biconvex lens fixed to the negative lens component;

the positive lens component of the back lens group includes a positive biconvex lens having a strong convex surface facing the object side of the optical lens system.

18. A re-imaging objective optical lens system according to claim 1, wherein the first lens group includes a positive plano-convex lens;

the third lens group includes a positive biconvex lens;

the positive biconvex lens of the third lens group includes a strong convex surface facing the secondary image;

the negative lens component of the cemented double lens element of the back lens group comprises a biconcave lens with a strong concave surface facing the secondary image;

the cemented double lens element of the back lens group includes a positive lens component in the form of a positive biconvex lens with a strong convex surface facing the object side of the optical lens system fixed to the negative lens component; and the positive lens component of the back lens group includes a positive meniscus lens with a convex surface facing the object side of the optical lens system.

19. A re-imaging optical lens system according to claim 1, wherein the first lens group includes a positive plano-convex lens having a convex surface, the convex surface of the positive plano-convex lens faces the object side of the optical lens system;

the third lens group includes a positive biconvex lens;

the positive biconvex lens includes a strong convex surface facing the secondary image;

the negative lens component of the cemented double lens element of the back lens group comprises a biconcave lens with a strong concave surface facing the secondary image;

the cemented double lens element of the back lens group includes a positive lens component in the form of a positive biconvex lens with fixed to the negative lens component; and a strong convex surface facing the object side of the optical lens system; and the positive lens component of the back lens group includes a positive meniscus lens with a convex surface facing the object side of the optical lens system.

20. A re-imaging optical lens system according to claim 19, further including a color separation prism on the optical path of the optical lens system.

21. A re-imaging optical lens system which forms a secondary image of a spatial image under a specific magnification, the secondary image positioned on an object side of the optical lens system facing the spatial image formed by the optical lens system, the re-imaging optical lens system comprising:

a front lens group and a back lens group;

the front lens group comprising, in order from the object side of the optical lens system, a first lens group having a positive lens component, a second lens group having a negative biconcave lens component with a highly concave surface facing the secondary image, and a third lens group having a positive lens component;

the back lens group comprising a cemented double lens element with a negative lens component facing the front lens group, and the back lens group also comprises a positive lens component, wherein the spatial image is formed on an optical path between the first lens group and the second lens group, and the re-imaging optical lens system satisfies the following conditions:

$$0.3 \leq (f11/f1) \leq 0.85$$

$$0.07 \leq (|ra|/f1) \leq 0.55$$

$$0 \leq (D/f1) \leq 0.25$$

where f1 is the composite focal length of the front lens group; f11 is the focal length of the first lens group; ra is the radius of curvature of the lens surface of the negative lens component in the second lens group facing the secondary image; and D is the distance between the second lens group and the third lens group of the front lens group.

22. The re-imaging optical lens system according to claim 21, wherein the re-imaging optical lens system satisfies the following conditions:

$$0.17 \leq (|rb|/f2) \leq 0.95$$

$$0.65 \leq (f22/f2) \leq 1.8$$

where f2 is the composite focal length of the back lens group; f22 is the focal length of the positive lens component in the back lens group; and rb is the radius of curvature of a composition surface of the cemented double lens element in the back lens group.

* * * * *